United States Patent Office 3,072,722
Patented Jan. 8, 1963

3,072,722
PREPARATION OF AMIDES OF 4-TERTIARY AMINO-LOWER 4-ALKYLBUTYRIC ACIDS
Brooke D. Aspergren and Robert B. Moffett, Kalamazoo, and Merrill E. Speeter, Kalamazoo Township, Kalamazoo County, Mich., assignors to The Upjohn Company, Kalamazoo, Mich., a corporation of Michigan
No Drawing. Filed July 21, 1955, Ser. No. 523,618
6 Claims. (Cl. 260—558)

This invention relates to a novel process and to novel compounds produced therein, and is particularly directed to a novel process for preparing 4-tertiaryamino-lower-4-alkylbutyramides and to novel intermediates therefor.

This application is a continuation-in-part of copending application Serial No. 516,764, filed June 20, 1955, now Patent No. 3,022,314.

It is known that primary tertiaryamino-2,2-diphenyl-alkanoamides can be prepared by alkylating 2,2-diphenyl-acetonitrile with a tertiaryaminoalkyl halide and hydrolyzing the resulting nitrile to the desired amide. See Bockmühl et al., German Patent 731,561; Bockmühl et al., Ann. 561, 42 (1948); Cheney et al., J. Org. Chem. 17, 771 (1952); Wheatley et al., J. Org. Chem., 19, 794 (1954); and Speeter (U.S. Patent 2,647,926). However, secondary and tertiary amides, that is, amides having respectively, one and two of the amido hydrogens replaced cannot be prepared by this process.

It is also known that tertiary amides of tertiaryamino-2,2-diphenylalkanoic acids can be prepared by reacting a 2,2-diphenylacetic acid halide with a secondary amine to form a tertiary amide and alkylating the product with a tertiaryaminoalkyl halide. See Bockmühl et al. and Cheney et al., supra. Secondary amides, however, cannot be prepared by this process.

It is also known that amides can be prepared by reacting the corresponding acid halide with ammonia or a primary or secondary amine. A process of this type was used by Bockmühl et al., supra, to prepare α,α-diphenyl-1-piperidinebutyramide using phosphorous pentachloride to form the intermediate acid chloride. Attempts to prepare 4-tertiaryamino-2,2-diphenylbutyramides by this process using thionyl chloride for the preparation of the acid chloride have been unsuccessful, however, because the acid halides either do not form when thionyl halide is used, or are unstable with the result that pyrrolidones are formed instead of the desired acid halides. Clarke et al., J. Am. Chem. Soc. 71, 2821 (1949). These cyclizations are independent of the nature of the tertiaryamino group. Even with cyclic tertiary groups such as pyrrolidino, piperidino, morpholino, and the like, the heterocycle is opened and cyclization occurs. Clarke et al., supra; Lucas et al., U.S. Patent 2,555,354.

It has now been found that cyclization of 4-tertiary-aminobutyryl halides prepared from thionyl halide does not take place or is greatly inhibited if the 4-position is substituted by a methyl or like lower-alkyl group, and that 4-tertiaryamino-lower-4-alkylbutyramides can be prepared by reacting a 4-tertiaryamino-lower-4-alkylbutyric acid with thionyl halide and subjecting the acid halide so obtained to aminolysis (including amonolysis) to form the desired amide.

The conversion of the acids to the acid halides by means of thionyl halide is effected according to the methods well known in the art for forming acid halides of carboxylic acids. Ordinarily it will be sufficient to mix the reactants at room temperature, and to apply gentle heating, as on a steam bath, toward the end of the reaction, and then to remove the excess thionyl halide by evaporation under reduced pressure. It is desirable to keep the temperature at all times below about 80 to 100 degrees centigrade in order to minimize or prevent cyclization.

The aminolysis is also carried out according to procedures well known in the art. Ordinarily it will be sufficient to mix the reactants with cooling, if necessary, in the initial stages of the reaction, as in an ice bath, and with gentle heating, as on a steam bath. At all times the temperature should be kept below about 80 to 100 degrees centigrade in order to prevent or minimize cyclization. The aminolysis is advantageously carried out in an inert solvent such as benzene, toluene, xylene, ethylene dichloride, aliphatic hydrocarbons, di-lower-alkyl ethers and the like. The formation of the acid halides can also be carried out in such inert solvents.

The process of the invention is useful in preparing known amides, for example, 4-dimethylamino-2,2-diphenylvaleramide, 4-piperidino-2,2-diphenylvaleramide, 4-diethylamino-2,2-diphenylvaleramide, and the like (Speeter, supra). It is also useful in preparing N-mono- and N-di-substituted analogues thereof. In particular it is applicable to preparing amides of 4-tertiaryamino-lower-4-alkylbutyramides containing two alpha substituents. The alpha substituents can be varied widely as shown by Clarke et al. and Speeter, supra. Thus the process of the invention is particularly useful in preparing amides having the following basic general formula:

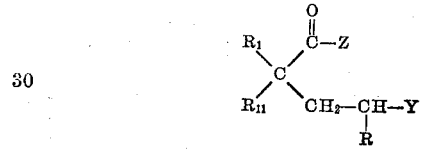

wherein R is an alkyl radical containing not more than four carbon atoms; $R_1$ and $R_{11}$ are lower-hydrocarbyl groups such as lower-alkyl, lower-alkenyl, lower-cycloaliphatic, lower-aralkyl, lower-aryl and the like; Z is an amido radical; and Y is a tertiary amino radical. The term "lower" is intended to mean not more than eight carbon atoms. The term "hydrocarbyl" is intended to mean hydrocarbon radicals which can be substituted by indifferent substituents, that is, substituents which are inert in the reactions involved in the process, such as chlorine, bromine, iodine, nitro, hydroxy, lower-alkoxy, lower-tertiaryamino, and the like. The tertiaryamino radicals can be either acrylic or cyclic (heterocylic) and for the most part are di-lower-alkylamino radicals in which the alkyl groups can be linked together to form with the nitrogen atom, a saturated heterocyclic group such as pyrrolidino, piperidino, and morpholino groups and the homologues thereof. The amido group can be primary, secondary, or tertiary. In the secondary- and tertiary-amido groups the N-substituents advantageously are lower-hydrocarbyl.

Examples of lower-alkyl groups are methyl, ethyl, propyl, butyl, hexyl, octyl, and the like, including isomeric forms thereof. Examples of lower-alkenyl groups are allyl, 1-propenyl, the various butenyls, hexenyls, octenyls, and the like, including isomeric forms thereof. Examples of lower-cycloaliphatic groups are cyclopropyl, cyclobutyl, cyclopentyl, methylcyclopentyl, cyclohexyl, dimethylcyclohexyl, cyclohexenyl, and the like; including isomeric forms thereof. Examples of lower-aralkyl groups are benzyl, methylbenzyl, phenethyl, and the like, including isomeric forms thereof. Examples of lower-aryl groups are phenyl, tolyl, xylyl, chlorophenyl, dichlorophenyl, chlorotolyl, and the like, including isomeric forms thereof. Examples of tertiaryamino radicals are di-lower-alkylamino radicals in which the alkyl radicals can be the same or different and can be methyl, ethyl, propyl, butyl, hexyl, octyl, and the like, including the isomeric forms thereof, and di-lower-alkylamino radicals in which the alkyl groups are linked together in a saturated heterocyclic group such as pyrrolidino, morpholino, and piperidino radicals and the homologues thereof such as 2-methylmorpholino, 2,2-dimethylpyrrolidino, 4-methylpiperidino, and the like.

The novel compounds of the invention can be prepared by the following sequence of reactions:

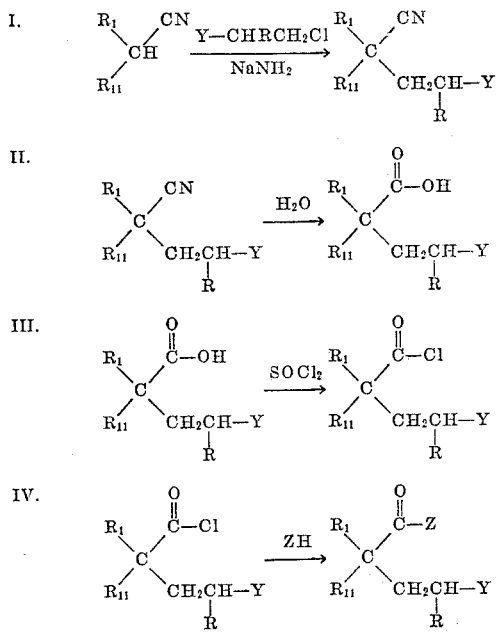

in which Y, Z, R, $R_1$, and $R_{11}$ are as identified above.

The starting compounds for steps I and II are well known in the art. Cheney et al., Wheatley et al., Bockmühl et al., and Speeter, supra. An alternative synthesis for step I involves the reaction of the starting compound I with a 1,2-dihaloalkane containing from three to six carbon atoms, separating the 4-halovaleronitrile isomer, and aminating it to the desired tertiaryamino derivative. Cheney et al., supra. 1-halo-2-alkanols containing from three to six carbon atoms can also be used to form the 4-hydroxy analogues and are of advantage in that no isomer is formed. The desired tertiaryamino nitriles are then obtained by treating the hydroxy compound with thionyl chloride to form the 4-chloro analogue which is then converted to the desired tertiaryamino nitrile by aminolysis with a secondary amine. These procedures make it possible to prepare starting compounds having a wide variety of tertiaryamino groups since the necessary 1,2 - dihaloalkanes, 1-halo-2-alkanols, and tertiary amines are well known in the art.

The products obtained by the process of the invention constitute a class of therapeutically and pharmacologically active amines. The unsubstituted amides are active anticholinergic materials whereas the substituted amides are active diuretics. The monosubstituted amides have superior oxytocic properties.

The invention may now be more fully understood by referring to the following examples which are illustrative of the process of the invention, but are not to be construed as limiting.

EXAMPLE 1

*Preparation of 4-Dimethylamino-N-Isopropyl-2,2-Diphenylvaleramide and Salts Thereof*

(A) *Acid sulfate of 4-dimethylamino-2,2-diphenylvaleric acid.*—A solution of 600 milliliters of concentrated sulfuric acid and 350 milliliters of water was cooled in an ice bath and then gradually added, with stirring, to a three-liter flask containing 500 grams (1.8 moles) of 4-dimethylamino-2,2-diphenylvaleronitrile (Cheney et al., supra). The reaction mixture was stirred and heated at 150 degrees centigrade for five hours, allowed to stand overnight, and filtered through a sintered-glass funnel. The resulting crude, solid product was washed with cold absolute ethyl alcohol and recrystallized from three liters of methyl alcohol. There was thus obtained 627 grams (88 percent yield) of the acid sulfate of 4-dimethylamino-2,2-diphenylvaleric acid, melting point 220–222 degrees centigrade.

(B) *Acid sulfate of 4 - dimethylamino-2,2-diphenylvaleryl chloride.*—Thionyl chloride (525 milliliters) was rapidly added with stirring to 350 grams (0.885 mole) of the acid sulfate of 4-dimethylamino-2,2-diphenylvaleric acid (Part A, this example). The reaction mixture was stirred for 1.5 hours at room temperature and then for one hour on a steam bath. Excess thionyl chloride was removed by distillation under reduced pressure at fifty degrees centigrade until the mixture solidified. Then 500 milliliters of benzene was added, and about one-half of it was removed by distillation under reduced pressure. The resulting slurry was filtered; the recovered solid was washed successively with benzene and ether, and dried in a vacuum desiccator over calcium chloride. There was thus obtained in crystalline condition 355 grams (97 percent yield) of the acid sulfate of 4-dimethylamino-2,2-diphenylvaleryl chloride.

(C) *4 - dimethylamino - N - isopropyl - 2,2 - diphenylvaleramide free base.*—To a mixture of 400 milliliters of benzene and 207 grams (0.5 mole) of the acid sulfate of 4-dimethylamino-2,2-diphenylvaleryl chloride (Part B, this example), cooled with an ice bath, there was gradually added 177.6 grams (three moles) of isopropylamine. The mixture was heated for one hour on a steam bath, and filtered to remove solid material. The filtrate was dried with anhydrous sodium sulfate and benzene was removed by distillation. The residual oil soon solidified and this solid was recrystallized from 200 milliliters of cyclohexane. The recrystallized material was shaken with a solution of 100 milliliters of concentrated hydrochloric acid and 500 milliliters of water. The mixture was filtered to remove insoluble material; the latter was washed with water. The combined acid solution and water washings were made alkaline, whereupon a rather oily solid formed. The solid was extracted into benzene, and the benzene solution was dried over anhydrous sodium sulfate and evaporated to dryness. The solid residue was recrystallized from 200 milliliters of cyclohexane to provide 80.3 grams (47.5 percent yield) of 4-dimethylamino - N-isopropyl-2,2-diphenylvaleramide, having a melting point of 115–117 degrees centigrade and the following analysis.

*Analysis.*—Calcd. for $C_{22}H_{30}N_2O$: C, 78.06; H, 8.93; N, 8.28. Found: C, 78.16; H, 8.89; N, 8.29.

(D) *4-dimethylamino-N-isopropyl-2,2 - diphenylvaleramide hydrochloride.*—To a solution of 4-dimethylamino-N-isopropyl-2,2-diphenylvaleramide (Part C, this example) in methyl ethyl ketone was added a solution of hydrogen chloride in ethyl alcohol. The 4-dimethylamino-N-isopropyl-2,2-diphenylvaleramide hydrochloride thus obtained had a melting point of 216–218 degrees centigrade and the following analysis.

*Analysis.*—Calcd. for $C_{22}H_{31}ClN_2O$: C, 70.47; H, 8.33; Cl, 9.46; N, 7.47. Found: C, 70.22; H, 8.37; Cl, 9.50; N, 7.73.

(E) *4 - dimethylamino - N - isopropyl - 2,2 - diphenylvaleramide methobromide.*—An excess of cold methyl bromide was added to a flask containing a cold solution of 46 grams of 4-dimethylamino-N-isopropyl-2,2-diphenylvaleramide (Part C, this example) in 100 milliliters of benzene. The flask was tightly closed and allowed to stand at room temperature for six days. Ether was added to the solution to precipitate 4-dimethylamino-N-isopropyl-2,2-diphenylvaleramide methobromide which, after recrystallization from an ether-ethyl acetate mixture, had a melting point of 155–158 degrees centigrade and the following analysis.

*Analysis.*—Calcd. for $C_{23}H_{33}BrN_2O$: C, 63.73; H, 7.67; Br, 18.44; N, 6.46. Found: C, 64.09; H, 7.71; Br, 18.27; N, 6.36.

EXAMPLE 2

Preparation of N-Cyclohexyl-4-Dimethylamino-2,2-Diphenylvaleramide and Salts Thereof (A) *N-cyclohexyl - 4 - dimethylamino - 2,2 - diphenylvaleramide free base.*—A total of 45.5 grams (0.11 mole) of the acid sulfate of 4-dimethylamino-2,2-diphenylvaleryl chloride (Example 1, Part B) was added in small portions to a solution of 54.5 grams (0.55 mole) of cyclohexylamine in 150 milliliters of dry benzene. During this addition and for five hours thereafter the reaction mixture was cooled with an ice bath and stirred. The mixture was brought to room temperature and filtered, and the filtrate was extracted with several portions of dilute hydrochloric acid. The combined aqueous acid extracts were made alkaline and the mixture was extracted with benzene. The benzene solution was dried and evaporated under reduced pressure. The residual solid was recrystallized from fifty percent aqueous isopropyl alcohol, N-cyclohexyl-4-dimethylamino-2,2 - diphenylvaleramide, melting point 80–90 degrees centigrade, being thus obtained. A sample of this product after being dried under reduced pressure at 78 degrees centigrade, had a melting point of 94–97 degrees centigrade and the following analysis.

*Analysis.*—Calcd. for $C_{25}H_{34}N_2O$: C, 79.32; H, 9.05; N, 7.40. Found: C, 79.66; H, 8.91; N, 7.48.

(B) *N-cyclohexyl - 4 - dimethylamino - 2,2 - diphenylvaleramide hydrochloride.*—A solution of one gram of hydrogen chloride in 3.8 milliliters of ethyl alcohol was added to an ethyl acetate solution of four grams (0.011 mole) of N-cyclohexyl-4 - dimethylamino - 2,2 - diphenylvaleramide (Part A, this example). Addition of ether precipitated N-cyclohexyl-4-dimethylamino-2,2 - diphenylvaleramide hydrochloride as a gummy solid. Recrystallization from ethyl acetate yielded the hydrochloride as a crystalline product having a melting point of 189–191 degrees centigrade and the following analysis.

*Analysis.*—Calcd. for $C_{25}H_{35}ClN_2O$: C, 72.35; H, 8.50; Cl, 8.54; N, 6.75. Found: C, 72.07; H, 8.64; Cl, 8.40; N, 6.22.

(C) *N-cyclohexyl - 4 - dimethylamino - 2,2 - diphenylvaleramide methobromide.*—By substituting N-cyclohexyl-4-dimethylamino-2,2-diphenylvaleramide (Part A, this example) as the starting tertiary amine in the procedure of Example 1, Part E, there was obtained N-cyclohexyl-4-dimethylamino - 2,2 - diphenylvaleramide methobromide. This product melted between 130 and 135 degrees centigrade and had the following analysis.

*Analysis.*—Calcd. for $C_{26}H_{37}BrN_2O$: C, 65.95; H, 7.88; Br, 16.88; N, 5.92. Found: C, 66.55; H, 7.98; Br, 16.38; N, 5.67.

EXAMPLE 3

Preparation of 4-Dimethylamino-N-Methyl-2,2-Diphenylvaleramide and Salts Thereof (A) *4-dimethylamino-N - methyl - 2,2 - diphenylvaleramide free base.*—To a benzene slurry of the acid sulfate of 4 - dimethylamino - 2,2 - diphenylvaleryl chloride (Example 1, Part B) cooled in an ice bath was slowly added, with stirring, sufficient of a benzene solution of methylamine to provide an excess of the latter. The reaction mixture was heated under reflux for one hour, after which water and dilute hydrochloric acid were added. The aqueous phase was separated, washed with benzene, and made alkaline with caustic soda. 4-dimethylamino-N-methyl - 2,2 - diphenylvaleramide separated as a solid. After recrystallization from isopropyl alcohol, the product had a melting point of 168–169 degrees centigrade and the following analysis.

*Analysis.*—Calcd. for $C_{20}H_{26}N_2O$: C, 77.38; H, 8.44; N, 9.03. Found: C, 77.71; H, 8.46; N, 9.22.

(B) *4-dimethylamino - N-methyl - 2,2 - diphenylvaleramide hydrochloride.*—4 dimethylamino-N - methyl - 2,2-diphenylvaleramide hydrochloride, prepared by adding a slight excess of a solution of hydrogen chloride in ethyl alcohol to a solution of 4-dimethylamino-N-methyl-2,2-diphenylvaleramide (Part A, this example) in ethyl acetate, had a melting point of 219–221 degrees centigrade and the following analysis.

*Analysis.*—Calcd. for $C_{20}H_{27}ClN_2O$: C, 69.24; H, 7.84; Cl, 10.22; N, 8.08. Found: C, 69.17; H, 7.58; Cl, 10.10; N, 8.31.

(C) *4-dimethylamino-N - methyl - 2,2 - diphenylvaleramide methobromide.*—The procedure of Example 1, Part E, was employed to react forty grams of methyl bromide with ten grams of 4-dimethylamino-N-methyl-2,2-diphenylvaleramide (Part A, this example) dissolved in 100 milliliters of benzene. The product, 4-dimethylamino-N-methyl-2,2-diphenylvaleramide methobromide, had a melting point of 190–192 degrees centigrade and the following analysis.

*Analysis.*—Calcd. for $C_{21}H_{29}BrN_2O$: C, 62.22; H, 7.21; Br, 19.71; N, 6.91. Found: C, 62.16; H, 7.03; Br, 19.65; N, 6.90.

EXAMPLE 4

Preparation of 4-Dimethylamino-N-Ethyl-2,2-Diphenyl-Valeramide and Salts Thereof (A) *4-dimethylamino-N-ethyl-2,2 - diphenylvaleramide free base.*—A solution of 45 grams (one mole) of ethylamine in 200 milliliters of benzene was gradually added, with stirring, to a slurry of 82.8 grams (0.2 mole) of the acid sulfate of 4-dimethylamino-2,2-diphenylvaleryl chloride (Example 1, Part B) in 100 milliliters of benzene. The reaction mixture was heated under reflux for one hour. A solution of 100 milliliters of concentrated hydrochloric acid and 200 milliliters of water was added with agitation, the aqueous phase was separated, and 400 milliliters of twenty percent sodium hydroxide solution was added thereto. The resulting solid precipitate was recrystallized from isopropyl alcohol. There was thus obtained an 84 percent yield of 4-dimethylamino-N-ethyl-2,2-diphenylvaleramide having a melting point of 133–135 degrees centigrade and the following analysis.

*Analysis.*—Calcd. for $C_{21}H_{28}N_2O$: C, 77.73; H, 8.70; N, 8.64. Found: C, 78.01; H, 8.40; N, 8.42.

(B) *4-dimethylamino-N-ethyl-2,2 - diphenylvaleramide hydrochloride.*—A slight excess of an ethyl alcohol solution of hydrogen chloride was added to a solution of 16.2 grams (0.05 mole) of 4-dimethylamino-N-ethyl-2,2-diphenylvaleramide (Part A, this example) in ethyl acetate. There was thus obtained an 86 percent yield of 4-dimethylamino-N-ethyl-2,2-diphenylvaleramide hydrochloride having a melting point of 197–199 degrees centigrade and the following analysis.

*Analysis.*—Calcd. for $C_{21}H_{29}ClN_2O$: C, 69.88; H, 8.10; Cl, 9.82; N, 7.76. Found: C, 69.69; H, 7.83; Cl, 9.66; N, 7.63.

(C) *4-dimethylamino-N-ethyl-2,2 - diphenylvaleramide methobromide.*—Starting with fifty grams of methyl bromide and a solution of 16.2 grams (0.05 mole) of 4-dimethylamino-N-ethyl-2,2 - diphenylvaleramide (Part A, this example) in 100 milliliters of benzene, and following the procedure set forth in Example 1, Part E, a 98 percent yield of 4-dimethylamino-N-ethyl-2,2-diphenylvaleramide methobromide was obtained. This compound, after recrystallization from isopropyl alcohol, had a melting point of 176–178 degrees centigrade and the following analysis.

*Analysis.*—Calcd. for $C_{22}H_{31}BrN_2O$: C, 63.00; H, 7.45; Br, 19.06; N, 6.68. Found: C, 62.86; H, 7.16; Br, 18.83; N, 6.78.

EXAMPLE 5

Preparation of N-Allyl-4-Dimethylamino-2,2-Diphenyl-Valeramide and Salts Thereof (A) *N-allyl-4-dimethylamino-2,2 - diphenylvaleramide free base.*—Allylamine (57.1 grams, one mole) was slowly added to a stirred slurry of 82.8 grams (0.2 mole)

of the acid sulfate of 4-dimethylamino-2,2-diphenylvaleryl chloride (Example 1, Part B) in 100 milliliters of benzene, and the reaction mixture was heated under reflux for one hour. The work-up procedure was essentially the same as described in Example 4, Part A. There was thus obtained crude N-allyl-4-dimethylamino-2,2-diphenylvaleramide, which on recrystallization from isopropyl alcohol gave 56.8 grams (84.4 percent yield) of pure product having a melting point of 99–101 degrees centigrade and the following analysis.

Analysis.—Calcd. for $C_{22}H_{28}N_2O$: C, 78.53; H, 8.39; N, 8.33. Found: C, 78.78; H, 8.32; N, 8.59.

(B) *N-allyl-4-dimethylamino-2,2 - diphenylvaleramide hydrochloride.*—To a solution of 16.8 grams (0.05 mole) of N - allyl - 4 - dimethylamino - 2,2 - diphenylvaleramide (Part A, this example) in 100 milliliters of ethyl acetate was added the theoretical amount of a solution of hydrogen chloride in ethyl alcohol. The reaction mixture was allowed to stand in a refrigerator, whereupon the desired product, N-allyl-4-dimethylamino-2,2-diphenylvaleramide hydrochloride, crystallized. After recovery of filtration, washing with benzene, and drying, this product weighed 13.5 grams (72 percent yield) and had a melting point of 167–170 degrees centigrade and the following analysis.

Analysis.—Calcd. for $C_{22}H_{29}ClN_2O$: C, 70.85; H, 7.84; Cl, 9.51; N, 7.51. Found: C, 70.55; H, 7.59; Cl, 9.53; N. 7.25.

(C) *N-allyl-4-dimethylamino-2,2 - diphenylvaleramide methobromide.*—Starting with fifty grams of methyl bromide, and 16.8 grams (0.05 mole) of N-allyl-4-dimethylamino-2,2-diphenylvaleramide (Part A, this example) and following the same procedure disclosed in Example 1, Part E, N-allyl-4-dimethylamino-2,2-diphenylvaleramide methobromide was obtained. Recrystallization from isopropyl alcohol gave a 98 percent yield of purified product having a melting point of 167–169 degrees centigrade and the following analysis.

Analysis.—Calcd. for $C_{23}H_{31}BrN_2O$: C, 64.03; H, 7.24; Br, 18.53; N, 6.50. Found: C, 63.94; H, 7.18; Br, 18.76; N, 6.29.

EXAMPLE 6

*Preparation of N-n-Butyl-4-Dimethylamino-2,2-Diphenyl-Valeramide and Methobromide Thereof*

Seventy grams of N-n-btuyl-4-dimethylamino-2,2-diphenylvaleramide (free base) was obtained as a thick oil by following the procedure of Example 5, Part A, except for the substitution of one mole of n-butylamine for allylamine.

Fifty grams of methyl bromide was added to a solution of 17.5 grams (0.05 mole) of N-n-butyl-4-dimethylamino-2,2-diphenylvaleramide in 100 milliliters of benzene. After one week ether was added, a gum being precipitated. Crystallization was induced by dropwise addition of ether to a boiling ethyl acetate solution of the gum. The N-n-butyl-4-dimethylamino-2,2-diphenylvaleramide methobromide thus obtained, after being recovered and dried, weighed seventeen grams (77.5 percent yield), melted 175–177 degrees centigrade, and had the following analysis.

Analysis.—Calcd. for $C_{24}H_{35}BrN_2O$: C, 64.42; H, 7.88; Br, 17.86; N. 6.28. Found: C, 64.61; H, 7.73; Br, 17.89; N, 6.25.

EXAMPLE 7

*Preparation of 4-Dimethylamino-2,2-Diphenylvaleranilide and Hydrochloride Thereof*

(A) *4-dimethylamino - 2,2 - diphenylvaleranilide free base.*—Forty grams (0.1 mole) of the acid sulfate of 4-dimethylamino-2,2-diphenylvaleryl chloride (Example 1, Part B) was gradually added, with stirring, to a solution of 46 grams (0.5 mole) of aniline in 500 milliliters of benzene. The reaction mixture was poured into water and made alkaline. The desired product, 4-dimethylamino-2,2-diphenylvaleranilide, crystallized. After recrystallization from methyl alcohol it had a melting point of 169–171 degrees centigrade and the following analysis.

Analysis.—Calcd. for $C_{25}H_{28}N_2O$: N, 7.52. Found: N, 6.86.

(B) *4 - dimethylamino-2,2-diphenylvaleranilide hydrochloride.*—An ether solution of 4-dimethylamino-2,2-diphenylvaleranilide (Part A, this example) and an ethyl alcohol solution of hydrogen chloride were mixed to produce 4-dimethylamino - 2,2 - diphenylvaleranilide hydrochloride, which after recrystallization from an ethyl alcohol-isopropyl alcohol mixture had a melting point of 243–244.5 degrees centigrade.

EXAMPLE 8

*Preparation of l-4-Dimethylamino-N-Methyl-2,2-Diphenylvaleramide and Salts thereof*

(A) *Acid sulfate of l-4-dimethylamino-2,2-diphenylvaleric acid.*—The acid sulfate of l-4-dimethylamino-2,2-diphenylvaleric acid was prepared according to the procedure of Example 1, Part A, by replacing the racemic 4 - dimethylamino - 2,2 - diphenylvaleronitrile employed therein with l-4-dimethylamino-2,2-diphenylvaleronitrile [Pohland et al., J. Am. Chem. Soc. 71, 461 (1949)].

(B) *Acid sulfate of l-4-dimethylamino-2,2-diphenylvaleryl chloride.*—The acid sulfate of l-4-dimethylamino-2,2-diphenylvaleryl chloride was prepared according to the procedure of Example 1, Part B, by replacing the acid sulfate of racemic 4-dimethylamino-2,2-diphenylvaleric acid employed therein with the acid sulfate of l-4-dimethylamino-2,2-diphenylvaleric acid (Part A, this example).

(C) *l-4-dimethylamino-N-methyl - 2,2 - diphenylvaleramide free base.*—A solution of twenty grams of methylamine in 100 milliliters of benzene was added dropwise to a stirred slurry of 36 grams of the acid sulfate of l-4-dimethylamino-2,2-diphenylvaleryl chloride (Part B, this example) and 200 milliliters of benzene. The reaction mixture was stirred for two hours at room temperature and then for one-half hour at reflux temperature. The mixture was washed with water and then extracted with 200 milliliters of ten percent hydrochloric acid, and the acid extract was made alkaline with 200 milliliters of twenty percent sodium hydroxide solution. l-4-dimethylamino-N-methyl-2,2-diphenylvaleramide precipitated as a solid. This compound, after recrystallization from dilute isopropyl alcohol, weighed 25.5 grams (94.5 percent yield) and had a melting point of 116–117 degrees centigrade, $[\alpha]_D^{22}$ minus 98 degrees (c.=1.4 in methyl alcohol), and the following analysis.

Analysis.—Calcd. for $C_{20}H_{26}N_2O$: C, 77.38; H, 8.44; N, 9.03. Found: C, 77.78; H, 8.12; N, 9.06.

(D) *l-4-dimethylamino-N-methyl - 2,2 - diphenylvaleramide hydrochloride.*—To a solution of ten grams of l-4-dimethylamino - N-methyl-2,2,-diphenylvaleramide (Part C, this example) in 100 milliliters of ethyl acetate was added a slight excess of a solution of hydrogen chloride in ethyl alcohol. Eleven grams (98.5 percent yield) of l-4-dimethylamino-N-methyl-2,2-diphenylvaleramide hydrochloride precipitated; melting point 221–223 degrees centigrade, $[\alpha]_D^{22}$ minus 64 degrees (c.=0.7 in methyl alcohol).

Analysis.—Calcd. for $C_{20}H_{27}ClN_2O$: C, 69.24; H, 7.84; Cl, 10.22; N, 8.08. Found: C, 69.49; H, 7.71; Cl, 10.22; N, 7.87.

(E) *l-4-dimethylamino-N-methyl-2,2-diphenylvaleramide methobromide.*—Ten grams of l-4-dimethylamino-N-methyl-2,2-diphenylvaleramide (Part C, this example) was dissolved in 100 milliliters of methyl ethyl ketone, thirty grams of methyl bromide was added to the solution, and the stoppered mixture was allowed to stand at room temperature for 24 hours. The resulting crystalline product was recovered and dried. There was thus obtained a substantially quantitative yield of l-4-dimethylamino-2,2-diphenylvaleramide methobromide having a melting point of 181–182 degrees centigrade, $[\alpha]_D^{22}$ minus 29 degrees (c.=1.0 in methyl alcohol), and the following analysis.

*Analysis.*—Calcd. for $C_{21}H_{29}BrN_2O$: C, 62.22; H, 7.21; Br, 19.71; N, 6.91. Found: C, 62.21; H, 7.56; Br, 19.65; N, 6.43.

EXAMPLE 9

*Preparation of d-4-Dimethylamino-N-Methyl-2,2-Diphenylvaleramide and Salts Thereof*

(A) *Acid sulfate of d-4-dimethylamino-2,2-diphenylvaleric acid.*—By following the procedure of Example 8, Part A, except for the substitution of d-4-dimethylamino-2,2-diphenylvaleronitrile (Pohland et al., surpra) for the l-isomer thereof, there was obtained the acid sulfate of d-4-methylamino-2,2-diphenylvaleric acid.

(B) *Acid sulfate of d-4-dimethylamino-2,2-diphenylvaleryl chloride.*—By following the procedure of Example 8, Part B, except for the substitution of the acid sulfate of d-4-dimethylamino-2,2-diphenylvaleric acid (Part A, this example) for the l-isomer thereof, there was obtained the acid sulfate of d-4-methylamino-2,2-diphenylvaleryl chloride.

(C) *d-4-dimethylamino-N-methyl-2,2-diphenylvaleramide free base.*—By following the procedure of Example 8, Part C, except for the substitution of the acid sulfate of d-4-dimethylamino-2,2-diphenylvaleryl chloride (Part B, this example) for the l-isomer thereof, there was obtained an 89 percent yield of d-4-dimethylamino-N-methyl-2,2-diphenylvaleramide having a melting point of 114–116 degrees centigrade and $[\alpha]_D^{22}$ plus 97 degrees (c.=0.9 in methyl alcohol).

(D) *d-4-dimethylamino-N-methyl-2,2-diphenylvaleramide hydrochloride.*—By following the procedure of Example 8, Part D, except for the substitution of d-4-dimethylamino-N-methyl-2,2-diphenylvaleramide (Part C, this example) for the l-isomer thereof, there was obtained d-4-dimethylamino-N-methyl-2,2-diphenylvaleramide hydrochloride. This compound had a melting point of 224–225 degrees centigrade, $[\alpha]_D^{22}$ plus 66 degrees (c.=1.4 in methyl alcohol), and the following analysis.

*Analysis.*—Calcd. for $C_{20}H_{27}ClN_2O$: C, 69.24; H, 7.84; Cl, 10.22. Found: C, 69.11; H, 7.63; Cl, 9.94.

(E) *d-4-dimethylamino-N-methyl-2,2-diphenylvaleramide methobromide.*—By following the procedure of Example 8, Part E, except for the substitution of d-4-dimethylamino-N-methyl-2,2-diphenylvaleramide (Part C, this example) for the l-isomer thereof, there was obtained d-4-dimethylamino-N-methyl-2,2-diphenylvaleramide methobromide having a melting point of 184–186 degrees centigrade, $[\alpha]_D^{22}$ plus 28 degrees (c.=1.3 in methyl alcohol), and the following analysis.

*Analysis.*—Calcd. for $C_{21}H_{29}BrN_2O$: C, 62.22; H, 7.21; Br, 19.71. Found: C, 62.03; H, 6.89; Br, 19.68.

EXAMPLE 10

*Preparation of 4-Dimethylamino-N-(2-Hydroxyethyl)-2,2-Diphenylvaleramide and Salts Thereof*

(A) *4-dimethylamino-N-(2-hydroxyethyl)-2,2-diphenylvaleramide free base.*—To a cooled solution of 161.9 grams (2.65 moles) of ethanolamine in 300 milliliters of benzene was gradually added, with stirring, 109.5 grams (0.265 mole) of the acid sulfate of 4-dimethylamino-2,2-diphenylvaleryl chloride (Example 1, Part B). Stirring was continued for several hours during which time the temperature of the reaction mixture was allowed to rise to about 25 degrees centigrade. The mixture stood overnight; water and chloroform were then added. The organic layer was separated, dried with anhydrous sodium sulfate, and the solution was concentrated to dryness. The residual 4-dimethylamino-N-(2-hydroxyethyl)-2,2-diphenylvaleramide was recrystallized twice from a mixture of cyclohexane and benzene. The purified product weighed 69.4 grams (77 percent yield) and had a melting point of 149.5–151.5 degrees centigrade and the following analysis.

*Analysis.*—Calcd. for $C_{21}H_{28}N_2O_2$: C, 74.08; H, 8.29; N, 8.23. Found: C, 74.55; H, 8.27; N, 8.17.

(B) *4-dimethylamino-N-(2-hydroxyethyl)-2,2-diphenylvaleramide hydrochloride.*—To a solution of ten grams (0.0295 mole) of 4-dimethylamino-N-(2-hydroxyethyl)-2,2-diphenylvaleramide (Part A, this example) in fifty milliliters of ethyl acetate was added a slight excess of an ethyl alcohol solution of hydrogen chloride. A solid precipitated but became oily on standing. By adding ten milliliters of ethyl alcohol to the mixture and heating on a steam bath for ten minutes, there was obtained 8.5 grams of crystalline 4-dimethylamino-N-(2-hydroxyethyl)-2,2-diphenylvaleramide hydrochloride having a melting point of 198–201 degrees centigrade and the following analysis.

*Analysis.*—Calcd. for $C_{21}H_{29}ClN_2O_2$: C, 66.91; H, 7.75; Cl, 9.41; N, 7.43. Found: C, 66.59; H, 7.74; Cl, 9.38; N, 7.15.

(C) *4-dimethylamino-N-(2-hydroxyethyl)-2,2-diphenylvaleramide methobromide.*—A stoppered reaction mixture consisting of ten grams (0.0295 mole) of 4-dimethylamino-N-(2-hydroxyethyl)-2,2-diphenylvaleramide (Part A, this example), forty grams of methyl bromide, and 100 milliliters of methyl ethyl ketone was allowed to stand at room temperature for 24 hours. The resulting hard solid was separated from the supernatant liquid and then heated on a steam bath for about ten minutes with a mixture of forty milliliters of isopropyl alcohol and fifty milliliters of ethyl acetate. The 4-dimethylamino-N-(2-hydroxyethyl)-2,2-diphenylvaleramide methobromide thus obtained weighed twelve grams (94 percent yield) and had a melting point of 170–171 degrees centigrade and the following analysis.

*Analysis.*—Calcd. for $C_{22}H_{31}BrN_2O_2$: C, 60.68; H, 7.18; Br, 18.36; N, 6.44. Found: C, 60.63; H, 7.00; Br, 18.19; N, 6.40.

EXAMPLE 11

*Preparation of 4-Dimethylamino-N-(2-Pyrrolidinoethyl)-2,2-Diphenylvaleramide and Dihydrochloride Thereof*

To seventy grams (0.662 mole) of 2-pyrrolidinoethylamine in 200 milliliters of benzene was added gradually, with cooling, 82.8 grams (0.2 mole) of the acid sulfate of 4-dimethylamino-2,2-diphenylvaleryl chloride (Example 1, Part B) in 200 milliliters of benzene in a two-liter, three-necked flask equipped with stirrer, reflux condenser, and dropping funnel. The reaction mixture was stirred at room temperature for six hours and at reflux temperature for one-half hour, after which it was washed with water and extracted with a solution of fifty milliliters of concentrated hydrochloric acid in 200 milliliters of water. The acid extract was made alkaline with 200 milliliters of twenty percent sodium hydroxide solution. The resulting oil was extracted into benzene. This solution was dried with anhydrous sodium sulfate, and the benzene was removed by distillation under reduced pressure. 4-dimethylamino-N-(2-pyrrolidinoethyl)-2,2-diphenylvaleramide free base was thus obtained as an oil. This oil was dissolved in ethyl acetate, and to the solution was added sufficient of an ethyl alcohol-hydrogen chloride solution to form the dihydrochloride. Addition of ether caused precipitation of a gummy solid. By recrystallizing this solid from an alcohol-ether mixture, 4-dimethylamino-N-(2-pyrrolidinoethyl)-2,2-diphenylvaleramide dihydrochloride was obtained as a hygroscopic solid, melting point 160–163 degrees centigrade.

*Analysis.*—Calcd. for $C_{25}H_{37}Cl_2N_3O$: C, 64.37; H, 8.00. Found: C, 64.48; H, 8.19.

EXAMPLE 12

*Preparation of 4-Dimethylamino-N-Methyl-2,2-Diphenylvaleramide N-Oxide and Salts Thereof*

Ten milliliters of thirty percent hydrogen peroxide was added to a suspension of 12.4 grams (0.04 mole) of 4-dimethylamino-N-methyl-2,2-diphenylvaleramide (Example 3, Part A) in 190 milliliters of methyl alcohol. The reaction mixture was shaken for sixteen hours during which all the solid material went into solution. The solution was allowed to stand at room temperature for four days and then an aqueous slurry of platinum-on-charcoal was added to decompose excess hydrogen peroxide. When oxygen evolution had subsided the mixture was shaken for six hours and then filtered, and the filtrate was evaporated to dryness below 55 degrees centigrade under reduced pressure. The crystalline residue was recrystallized from ethyl acetate. There was thus obtained 10.7 grams (82.5 percent yield) of 4-dimethylamino-N-methyl-2,2-diphenylvaleramide N-oxide (free base), melting point 144–146 degrees centigrade with decomposition.

Analysis.—Calcd. for $C_{20}H_{26}N_2O_2$: C, 63.75; H, 8.03; N, 8.58; O, 9.80. Found: C, 74.00; H, 8.12; N, 8.49; O, 9.86.

Samples of this product were converted to the hydrochloride and the hydrobromide, which were obtained as oils.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. In a process for the preparation of valeramides which comprises reacting an acid having the formula:

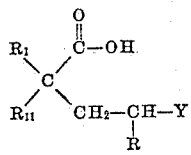

wherein R is alkyl, $R_1$ and $R_{11}$ are selected from the group consisting of lower alkyl, lower alkenyl, lower cycloaliphatic, lower aralkyl and lower aryl, and Y is tertiary amino with a thionyl halide, subjecting the thus obtained acid halide to aminolysis to form the desired amide, the improvement which comprises conducting the reactions at a temperature below about 100° C. whereby to minimize cyclization of the acid halide to the corresponding pyrrolidone.

2. In a process for preparing valeramides having the following formula

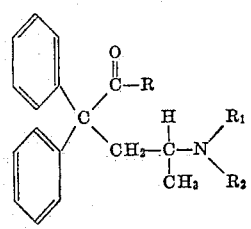

wherein R is selected from the group consisting of di-lower-alkylamino and mono-lower alkylamino, $R_1$ and $R_2$ are lower alkyl and together with the nitrogen atom form a heterocyclic radical selected from the group consisting of pyrrolidino, piperidino, and morpholino which comprises reacting 4-tertiaryamino-4-methyl-2,2-diphenyl butyric acid with a thionyl halide and reacting the obtained acid halide with the appropriate amine to obtain the corresponding valeramide, the improvement which comprises conducting the said reactions at a temperature below the cyclization temperature of the said obtained acid halide.

3. In a process for the preparation of amides of 4-tertiaryamino - 2,2 - diphenyl - 4-lower-alkylbutyric acids which comprises reacting an acid having the following formula:

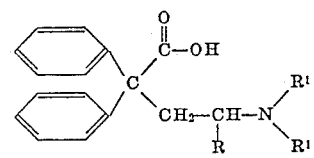

wherein R and $R^1$ are lower alkyl, with thionyl halide and subjecting the obtained acid halide to aminolysis to form an amide of 4-tertiaryamino-2,2-dipenyl-4-lower-alkylbutyric acid, the improvement which comprises conducting the reactions at a temperature below about 100 degrees centigrade whereby to minimize cyclization of the acid halide to the corresponding pyrrolidone.

4. The process of claim 3 in which the aminolysis is effected by a primary amine.

5. In a process for the preparation of 4-dimethylamino-2,2-diphenylvaleramides which comprises reacting 4-dimethylamino-2,2-diphenyl valeric acid with a thionyl halide to form the corresponding acid halide and subjecting the formed acid halide to aminolysis, the improvement which comprises conducting said reactions at a temperature below about 100 degrees centigrade whereby cyclization of the acid halide to the corresponding pyrrolidone is minimized.

6. The process of claim 5 in which the aminolysis is effected by a lower-alkyl amine.

References Cited in the file of this patent

UNITED STATES PATENTS

| | | |
|---|---|---|
| 2,370,015 | Dalmer et al. | Feb. 20, 1945 |
| 2,618,638 | Craig et al. | Nov. 18, 1952 |
| 2,647,926 | Speeter et al. | Aug. 4, 1953 |